United States Patent
Möbius et al.

(10) Patent No.: US 8,057,678 B2
(45) Date of Patent: Nov. 15, 2011

(54) MAINTENANCE OF METALLIZATION BATHS

(75) Inventors: Andreas Möbius, Kaarst (DE); Axel König, Herzogenaurach (DE); Hubertus F.A.M. van Dun, TM s-Hertogenbosch (NL)

(73) Assignee: Enthone Inc., West Haven, CT (US)

( * ) Notice: Subject to any disclaimer, the term of this patent is extended or adjusted under 35 U.S.C. 154(b) by 1346 days.

(21) Appl. No.: 11/039,088

(22) Filed: Jan. 19, 2005

(65) Prior Publication Data

US 2005/0194256 A1  Sep. 8, 2005

(30) Foreign Application Priority Data

Jan. 20, 2004 (DE) .................... 10 2004 002 778

(51) Int. Cl.
 *C23C 18/54* (2006.01)
(52) U.S. Cl. ...... 210/634; 210/644; 210/649; 427/443.1
(58) Field of Classification Search .......... 204/520–542; 210/634–655; 427/436–438, 443.1
See application file for complete search history.

(56) References Cited

U.S. PATENT DOCUMENTS

| | | | |
|---|---|---|---|
| 3,454,490 A | 7/1969 | Wallace | |
| 3,663,403 A | 5/1972 | Christenson et al. | |
| 4,253,928 A * | 3/1981 | Blytas et al. | 204/530 |
| 4,357,220 A * | 11/1982 | Eisenmann | 210/644 |
| 4,600,493 A | 7/1986 | Korngold | |
| 4,762,601 A * | 8/1988 | Krulik et al. | 427/345 |
| 4,805,553 A * | 2/1989 | Krulik | 427/345 |
| 5,419,821 A | 5/1995 | Vaughan | |
| 5,472,585 A | 12/1995 | Dinella et al. | |
| 5,523,001 A * | 6/1996 | Foeckler et al. | 210/721 |
| 6,264,809 B1 | 7/2001 | Lee | |
| 6,436,213 B1 | 8/2002 | Hopkins | |
| 6,723,218 B2 | 4/2004 | Hadley et al. | |
| 6,797,141 B1 | 9/2004 | Ludwig et al. | |
| 6,841,074 B2 | 1/2005 | Möbius et al. | |
| 2004/0144285 A1 | 7/2004 | Stark et al. | |

FOREIGN PATENT DOCUMENTS

| | | |
|---|---|---|
| EP | 0 015 737 B1 | 5/1983 |
| EP | 0 347 016 A2 | 12/1989 |
| EP | 613862 * | 1/1994 |
| EP | 1 239 057 A1 | 9/2002 |
| JP | 58011775 | 1/1983 |
| JP | 63000484 | 1/1988 |
| JP | 63007382 | 1/1988 |
| JP | 7286279 | 10/1995 |
| JP | 11226596 | 3/1999 |

OTHER PUBLICATIONS

Offinger, Acid Recycling at a Captive Finishing Shop, Dec. 1994, Products Finishing. pp. 62-66.*
Abstract of JP63000484; Jan. 5, 1988.
Abstract of JP63007382; Jan. 13, 1988.
Abstract of JP58011775; Jan. 22, 1983.
Abstract of JP11226596; Mar. 24, 1999.
Abstract of JP7286279; Oct. 31, 1995.

(Continued)

*Primary Examiner* — Arun S Phasge
(74) *Attorney, Agent, or Firm* — Senniger Powers LLP

(57) ABSTRACT

A method for the regeneration of an electrolyte bath used for an electroless metallization process. A partial flow of electrolyte is removed from the process vessel and regenerated by dialysis or electrodialysis. Metallization components are replenished. The partial flow is returned to the process vessel.

17 Claims, 2 Drawing Sheets

OTHER PUBLICATIONS

Stichwort "Ameisensäure" aus Römpp, Chemilelexikon, 1989, 2 pages.

Handbuch der Leiterplattentechnik, Band 3, Eugen G. Leuze Verlag, Saulgau, Germany, 1993, pp. 68-69.

* cited by examiner

MAINTENANCE OF METALLIZATION BATHS

REFERENCE TO RELATED APPLICATION

This application claims priority to German application 10 2004 002 778.1 filed 20 Jan. 2004, issued Mar. 27, 2008 as German Patent 102004002778.

FIELD OF THE INVENTION

The invention under consideration concerns a method for the maintenance of metallization baths in electroplating and electroforming technology. In particular, the invention concerns a method for the maintenance of metallization baths in the deposition of metals without a current.

BACKGROUND OF THE INVENTION

In the deposition of metals without an outside current, such as in the chemical deposition of copper from corresponding electrolytes without an outside current, a reducing agent is added to the electrolyte, which agent as an interior voltage source makes possible the deposition of the metal.

The basic principle of metal deposition without an outside current will be explained here with the example of a copper electrolyte.

As a rule, electrolytes for chemical copper deposition without an outside current contain complex- or chelate-bound copper ions, such as copper tartrate complexes or copper-EDTA chelates. Formaldehyde or a comparable reducing agent, which, as the result of an oxidation reaction to the formate or to the corresponding anion, provides the electrons needed for the reduction of the copper, is used, as a rule, as the reducing agent.

Formaldehyde, however, is able to act as a sufficiently strong reducing agent on divalent copper ions, as they are used, as a rule, in electrolytes for the deposition of copper without an outside current, and to make possible a metal deposition, only in a highly alkaline pH range such as between about pH 11 and about pH 14. From this, it follows that the copper ions present in the electrolyte are so strongly complexed or chelated that they cannot form hard-to-dissolve metal hydroxides.

Moreover, copper is introduced into the electrolyte, as a rule, in the form of sulfates. As a consequence of the reaction of divalent copper ions to elementary copper, the electrolyte is enriched with sulfate anions. This sulfate anions enrichment, produced by the oxidation of the formaldehyde in combination with the concentration increase of formate anions, leads to a lowering of the pH value. In order to continue to hold the electrolyte in a workable pH range, alkali hydroxides, such as sodium hydroxide, are added. Moreover, the consumed quantities of copper sulfate and formaldehyde are subsequently metered to the electrolyte. As a result of the foregoing, the chemical and physical characteristics of the electrolyte therefore change, which leads to a limited durability and applicability of the electrolyte.

Nickel baths without a current work mostly in an acidic pH range. There, bath maintenance by means of electrodialysis is already known from documents EP 1 239 057 A1, DE 198 49 278 C1, and EP 0 787 829 A1. The process described there and the combination of methods and membranes cannot be used, however, for copper without a current, or for others in alkaline metallization baths working without a current.

SUMMARY OF THE INVENTION

Thus, a goal of the invention is to make available a method which is able to overcome the aforementioned disadvantages and guarantee a longer electrolyte use and operability for the deposition of metals without a current.

This goal is attained, in accordance with the invention, by a method for the regeneration of electrolyte baths for metallization without a current by means of the following method steps:
   a) carrying off at least a partial flow of the electrolyte from the process vessel;
   b) regeneration of the carried-off electrolyte flow;
   c) addition of components used in the metallization process;
   d) return of regenerated electrolyte flow to the process vessel;
   characterized in that for the regeneration, the carried-off partial flow is supplied to a dialysis and/or electrodialysis unit, in which the anions released during the metallization process without a current are exchanged via an ion-selective membrane.

In an advantageous manner, the anions released in the metallization process are exchanged for hydroxide ions in the dialysis and/or electrodialysis unit in the method of the invention.

For this purpose, the dialysis and/or electrodialysis unit in the method of the invention advantageously has an anion-selective membrane.

As a counter-solution to the dialysis and/or electrodialysis of the electrolyte, alkali hydroxide-containing and/or alkaline earth hydroxide-containing solutions can be used in the method of the invention.

Such an invention is suitable for electrolytes for the deposition of copper, nickel, ternary nickel alloys, and gold, without a current.

The ions to be exchanged by means of dialysis and/or electrodialysis can be sulfate ions, formate ions, hypophosphite ions, phosphite ions, phosphate ions, chloride ions, and other anions which dissolve well.

Briefly, therefore, the invention is directed to a method for the regeneration of alkali, cyanide-free, zinc- and nickel-containing electrolyte baths for metallization without a current. The method of the invention has the following steps: the carrying-off of at least a partial flow of the electrolyte from the process vessel into a regeneration unit, the return of the regenerated electrolyte flow to the process vessel, wherein the regeneration unit has a dialysis and/or electrodialysis unit with an anion-selective membrane and in which the anions formed during the process of the metallization without a current are exchanged for hydroxide ions. The electrolyte current thus regenerated can be supplemented by the consumed components.

In another aspect, the invention is a method for the regeneration of an electrolyte bath used for a metallization process without a current in a process vessel comprising removing at least a partial flow of the electrolyte from the process vessel; regenerating said at least partial flow removed in step (a) via an operation selected from the group consisting of dialysis and electrodialysis; c) adding metallization components to the at least partial flow; and d) returning the at least partial flow to the process vessel. The anions released during the metallization process are exchanged via an ion-selective membrane during said regeneration; and as a counter-solution for the regeneration, a solution is used which is selected from the group consisting of an alkali hydroxide-containing solution and an alkaline earth hydroxide-containing solution.

The invention is also directed to a method for the regeneration of an electrolyte bath used for a metallization process without a current in a process vessel comprising removing at least a partial flow of the electrolyte from the process vessel;

regenerating said at least partial flow removed in step (a) via an operation selected from the group consisting of dialysis and electrodialysis involving exchange of anions selected from the group consisting of sulfate ions, formate ions, hypophosphite ions, phosphite ions, phosphate ions, and chloride ions released during the metallization process for hydroxide ions via an anion-selective membrane and a counter-solution selected from the group consisting of an alkali hydroxide-containing solution and an alkaline earth hydroxide-containing solution; replenishing to the at least partial flow a metallic source for deposition of a metal selected from the group consisting of copper, nickel, a ternary nickel alloy, and gold; d) replenishing to the at least partial flow a reducing agent; and e) returning the at least partial flow to the process vessel.

In a further aspect the invention is directed to a method for the regeneration of an electrolyte bath used for an electroless copper metallization process in a process vessel comprising removing at least a partial flow of the electrolyte from the process vessel; regenerating said at least partial flow removed in step (a) via an operation selected from the group consisting of dialysis and electrodialysis involving exchange of sulfate ions released during the metallization process for hydroxide ions via an anion-selective membrane and a counter-solution selected from the group consisting of an alkali hydroxide-containing solution and an alkaline earth hydroxide-containing solution; replenishing copper sulfate to the at least partial flow as a metallic source for deposition of a copper; replenishing a reducing agent to the at least partial flow; and returning the at least partial flow to the process vessel.

In another refinement of the method of the invention, the alkali hydroxide-containing and/or alkaline earth hydroxide-containing solutions, used as a counter-solution in the dialysis and/or electrodialysis and/or electrodialysis process, are regenerated according to the dialysis process. This can occur, according to the invention, by suitable oxidation agents. Following such a regeneration, the alkali and/or alkaline-earth solutions can optionally be concentrated.

Another possibility for regenerating the used alkali and/or alkaline earth solutions in the method of the invention is the precipitation of the anions received in the dialysis and/or electrodialysis process as hard-to-dissolve salts. Such a salt can be, for example, the hard-to-dissolve barium sulfate, in the case of sulfate ions, which can be precipitated by the addition of barium hydroxide to the alkali hydroxide-containing and/or alkaline earth hydroxide-containing counter-solutions of the dialysis and/or electrodialysis processes to be regenerated. Other suitable salts are, for example, calcium hydroxide or, in general, other substances forming hard-to-dissolve compounds with sulfates.

Formate ions can be reacted in $CO_2$ and water by oxidation agents suitable for the regeneration of the counter-solutions. Suitable oxidation agents for such a reaction are hydrogen peroxide, peroxide sulfates or the product known as Caroat from the Degussa Company.

Prerequisite for the use of a dialysis and/or electrodialysis method for the regeneration of electrolytes for the deposition of metals without an outside current, is the use of anion-selective membranes in the dialysis and/or electrodialysis steps.

Suitable anion-selective membranes for a method in accordance with the invention are, for example, commercial mono- and bivalent anion-exchanger membranes from Tokuyama Soda Co. Ltd., Asaki Glass Co. Ltd., Purolite International, Polymerchemie Altmeier, or Reichelt Chemietechnik.

The application of an electric field in the dialysis step of the method of the invention advantageously accelerates the separation process.

In principle, the electrolyte to be regenerated and the alkali- and/or alkaline earth-containing counter-solution can be conducted in a parallel flow, as well as in a counter-flow, both when using a dialysis stage and also when using an electrodialysis stage.

DETAILED DESCRIPTION OF PREFERRED EMBODIMENTS

This application claims priority from German application 10 2004 002 778.1, the entire disclosure of which is expressly incorporated herein by reference.

Figure 1:
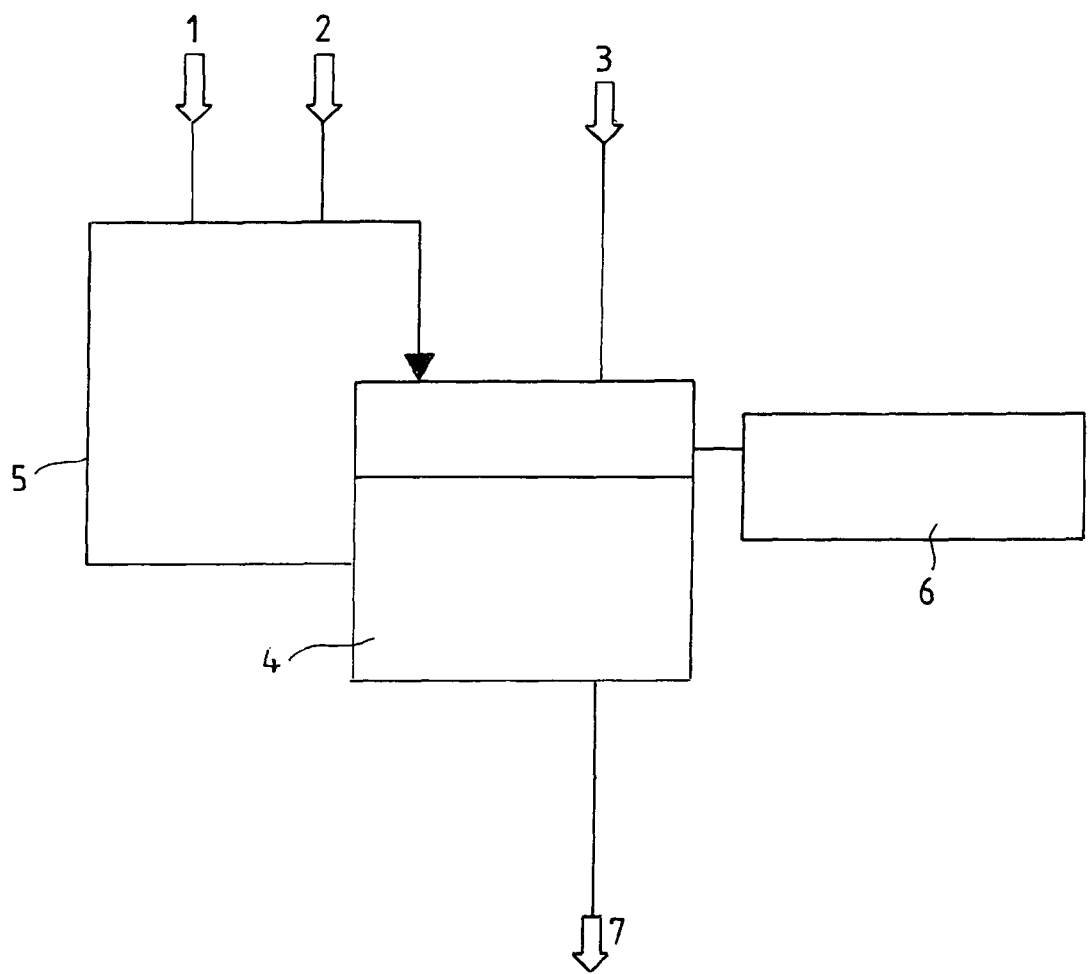
FIGS. 1 and 2 are schematic illustrations of variations of the invention.

FIG. 1 shows a conventional method for the metallization of substrates without a current. In the case of a copper deposition without a current on a substrate (3) to obtain a metallized substrate (7), a partial flow (5) is removed from the electrolyte (4), which partial flow is enriched with, for example, copper sulfate (1) and formaldehyde (2), as a function of the consumed quantity of metal ions and reducing agent, and is again supplied to the electrolyte (4). The electrolyte (4) is enriched, in the course of the method, with formate and sulfate ions (6).

Figure 2:
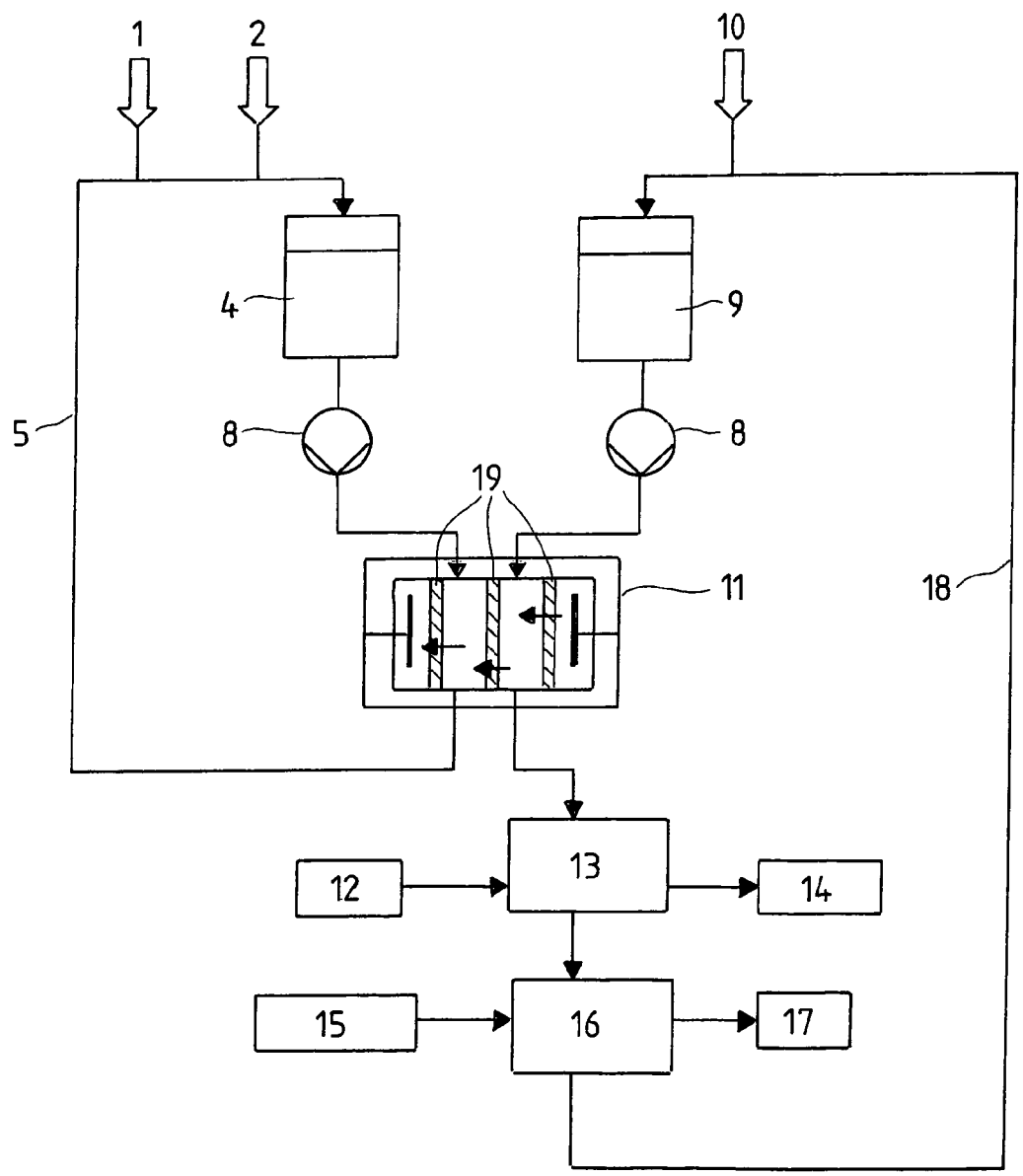

FIG. 2 shows the method of the invention for the regeneration of electrolytes for the deposition of metals without a current. A partial flow is removed from the electrolyte (4), for example, via a pump (8), and supplied to a dialysis and/or electrodialysis unit (11). The dialysis and/or electrodialysis unit has anion-selective membranes (19). The counter-solution for the dialysis/electrodialysis (9) is also supplied to the dialysis and/or electrodialysis unit (11), for example, via a pump (8). This can occur in a parallel flow or also in a counter-flow to the electrolyte (4) to be regenerated. The branched-off electrolyte partial flow (5) is enriched again with metal ions and reducing agents, following the regeneration in the dialysis and/or electrodialysis unit (11). These can be, for example, copper sulfate (1) and formaldehyde (2). In the case of copper sulfate and formaldehyde, formate and sulfate ions are received by the counter-solution (9) in the dialysis and/or electrolysis unit (11) via the anion-selective membrane (19). For the regeneration of the counter-solution, precipitation agents (12), such as barium hydroxide, can then be added to it for sulfate precipitation (13). The precipitated sulfates (14) can be separated. The formate ions received in the counter-solution can be reacted by the addition of oxidation agents (15) in an oxidation (16) to carbon dioxide (17) and water. The regenerated counter-solution (18) can be returned, with the addition of alkali and/or alkaline earth hydroxides (10).

REFERENCE SYMBOL LIST

1 Addition of copper sulfate
2 Addition of formaldehyde
3 Substrate to be metallized
4 Electrolyte for copper deposition without a current
5 Partial flow
6 Enrichment in formate and sulfate ions
7 Metallized substrate
8 Pump
9 Counter-solution for the dialysis/electrodialysis
10 Alkali-/Alkaline earth hydroxide addition
11 Dialysis/Electrodialysis unit 12 Addition of precipitation agent
13 Sulfate precipitation
14 Precipitated sulfates
15 Addition of oxidation agents
16 Oxidation of formate ions
17 Carbon dioxide
18 Return regenerated counter-solution
19 Anion-selective membrane When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above methods and products without departing from the scope of the invention, it is intended that all matter contained in the above description and shown in any accompanying drawings shall be interpreted as illustrative and not in a limiting sense.

What is claimed is:

1. A method for the regeneration of an electrolyte bath used for a metallization process without a current in a process vessel comprising:
   a) removing at least a partial flow of the electrolyte from the process vessel;
   b) regenerating said at least partial flow removed in step (a) said regenerating consisting of dialysis, wherein said dialysis excludes electrodialysis;
   c) adding metallization components to the at least partial flow; and
   d) returning the at least partial flow to the process vessel;
   whereby said dialysis excluding electrodialysis exchanges formate anions and sulfate anions released during the metallization process with hydroxide ions via an anion selective membrane through which said formate anions and sulfate anions pass from the partial flow of removed electrolyte to a counter solution and through which said hydroxide ions pass from said counter solution to the partial flow of removed electrolyte during said regeneration;
   whereby as said counter solution comprising a hydroxide ion source and recipient of said formate anions and sulfate anions for the regeneration, a solution is used which is selected from the group consisting of an alkali hydroxide-containing solution and an alkaline earth hydroxide-containing solution.

2. The method according to claim 1 wherein the metallization process is for deposition of at least one metal selected from the group consisting of copper, nickel, a ternary nickel alloy, or gold.

3. The method of claim 1 wherein the dialysis involves exchange of at least one additional ion from the group consisting of hypophosphite ions, phosphite ions, phosphate ions, and chloride ions.

4. The method according to claim 1 wherein the counter solution is conducted in a counter flow with respect to the partial flow of electrolyte.

5. The method according to claim 1 wherein the counter solution is conducted in parallel with respect to the partial flow of electrolyte.

6. The method of claim 1 further comprising regenerating the counter-solution after the dialysis.

7. The method according to claim 6 wherein at least one oxidation agent selected from the group consisting of hydrogen peroxide, peroxide sulfates, or potassium monopersulfate is used in regenerating the counter-solution.

8. The method of claim 1 further comprising precipitating the anions received in the counter-solution as hard to dissolve salts to regenerate the counter-solution after the dialysis.

9. The method of claim 8 wherein at least one substance selected from the group consisting of barium hydroxide and calcium hydroxide is used for said precipitation.

10. The method according to claim 1 wherein the metallization process is for deposition of copper.

11. A method for the regeneration of an electrolyte bath used for a metallization process without a current in a process vessel comprising:
   a) removing at least a partial flow of the electrolyte from the process vessel;
   b) regenerating said at least partial flow removed in step (a) said regenerating consisting of dialysis, wherein said dialysis excludes electrodialysis, involving exchange of anions selected from the group consisting of sulfate ions, formate ions, hypophosphite ions, phosphite ions, phosphate ions, and chloride ions released during the metallization process for hydroxide ions via an anion selective membrane and a counter solution comprising a hydroxide ion source and recipient of said formate anions and sulfate anions, wherein said counter solution is selected from the group consisting of an alkali hydroxide-containing solution and an alkaline earth hydroxide-containing solution;
   c) replenishing to the at least partial flow a metallic source for deposition of a metal selected from the group consisting of copper, nickel, a ternary nickel alloy, and gold;
   d) replenishing to the at least partial flow a reducing agent; and
   e) returning the at least partial flow to the process vessel.

12. The method of claim 11 further comprising regenerating the counter-solution by oxidation after dialysis.

13. The method of claim 11 further comprising precipitating the anions received in the counter-solution as hard to dissolve salts to regenerate the counter-solution after the dialysis.

14. The method of claim 13 wherein at least one substance selected from the group consisting of barium hydroxide and calcium hydroxide is used for said precipitation.

15. The method according to claim 11 wherein the metallization process is for deposition of copper.

16. A method for the regeneration of an electrolyte bath used for an electroless copper metallization process in a process vessel comprising:
   a) removing at least a partial flow of the electrolyte from the process vessel;
   b) regenerating said at least partial flow removed in step (a) said regenerating consisting of dialysis, wherein said dialysis excludes electrodialysis, involving exchange of sulfate ions released during the metallization process for hydroxide ions via an anion selective membrane and a counter solution comprising a hydroxide ion source and recipient of said formate anions and sulfate anions, wherein said counter solution is selected from the group consisting of an alkali hydroxide-containing solution and an alkaline earth hydroxide-containing solution;
   c) replenishing copper sulfate to the at least partial flow as a metallic source for deposition of a copper;
   d) replenishing a reducing agent to the at least partial flow; and
   e) returning the at least partial flow to the process vessel.

17. The method of claim 16 wherein the reducing agent comprises formaldehyde.

* * * * *